(12) United States Patent
Allen

(10) Patent No.: US 9,694,654 B1
(45) Date of Patent: Jul. 4, 2017

(54) VEHICULAR VISOR VISUAL DRIVING AID

(71) Applicant: Mark Anthony Allen, APO (JP)

(72) Inventor: Mark Anthony Allen, APO (JP)

( * ) Notice: Subject to any disclaimer, the term of this patent is extended or adjusted under 35 U.S.C. 154(b) by 0 days.

(21) Appl. No.: 15/194,560

(22) Filed: Jun. 27, 2016

Related U.S. Application Data

(63) Continuation-in-part of application No. 14/993,087, filed on Jan. 11, 2016.

(60) Provisional application No. 62/101,375, filed on Jan. 9, 2015.

(51) Int. Cl.
*B60J 3/02* (2006.01)
*B60J 3/06* (2006.01)

(52) U.S. Cl.
CPC ........... *B60J 3/0208* (2013.01); *B60J 3/0213* (2013.01); *B60J 3/0265* (2013.01); *B60J 3/06* (2013.01)

(58) Field of Classification Search
CPC . B60J 3/0208; B60J 3/06; B60J 3/0265; B60J 3/0213
USPC ....... 296/96.19, 97.1, 97.2, 97.4, 97.8, 97.9, 296/97.6
See application file for complete search history.

(56) References Cited

U.S. PATENT DOCUMENTS

| | | | | |
|---|---|---|---|---|
| 4,988,139 A * | 1/1991 | Yamada | ................. | B60J 3/0204 296/97.11 |
| 5,443,300 A * | 8/1995 | Mohammed | ............... | B60J 3/02 160/188 |
| 6,616,209 B1 * | 9/2003 | Muyo | .................... | B60J 3/0208 296/97.4 |
| 6,682,122 B1 * | 1/2004 | Prokhorov | ............. | B60J 3/0208 296/97.4 |
| 8,162,376 B1 * | 4/2012 | Grossmith | ............. | B60J 3/0243 296/97.11 |
| 2002/0033616 A1 * | 3/2002 | Schlecht | ................ | B60J 1/2027 296/138 |
| 2004/0155489 A1 * | 8/2004 | Kawasaki | ............. | B60J 3/0204 296/214 |
| 2005/0236864 A1 * | 10/2005 | Asai | ........................... | B60J 3/02 296/97.8 |
| 2006/0279101 A1 * | 12/2006 | Sahara | ....................... | B60J 3/02 296/97.8 |
| 2008/0217951 A1 * | 9/2008 | Aspel | ..................... | B60J 3/0208 296/97.8 |
| 2009/0134656 A1 * | 5/2009 | Mori | ...................... | B60J 7/0015 296/97.4 |
| 2009/0278375 A1 * | 11/2009 | Baudouin | ............. | B60J 3/0204 296/97.8 |
| 2010/0060028 A1 * | 3/2010 | Patel | ..................... | B60J 3/0208 296/97.1 |

* cited by examiner

*Primary Examiner* — Jason S Morrow
*Assistant Examiner* — E Turner Hicks
(74) *Attorney, Agent, or Firm* — Michael D. Eisenberg

(57) ABSTRACT

The present invention comprises a visor assembly for filtering sunlight through a field of view of a driver. The assembly has motorized tinted visors that can be set in a stowed position, positioned upward, and lowered into the field of vision of the driver, allowing sunlight to pass through the tinted visors for filtering, via forward and reverse buttons. The tinted visors can include at least one amber tinted visor. The amber tinted visor is amber in color, adding contrast and visual acetate distinction in low-light driving situations. The tinted visors can also include at least one gradient tinted visor. The gradient tinted visor has a color gradient transitioning from a dense, dark blue color, adding brilliance and attenuation, to clear acetate, providing an unobstructed view of traffic.

8 Claims, 4 Drawing Sheets

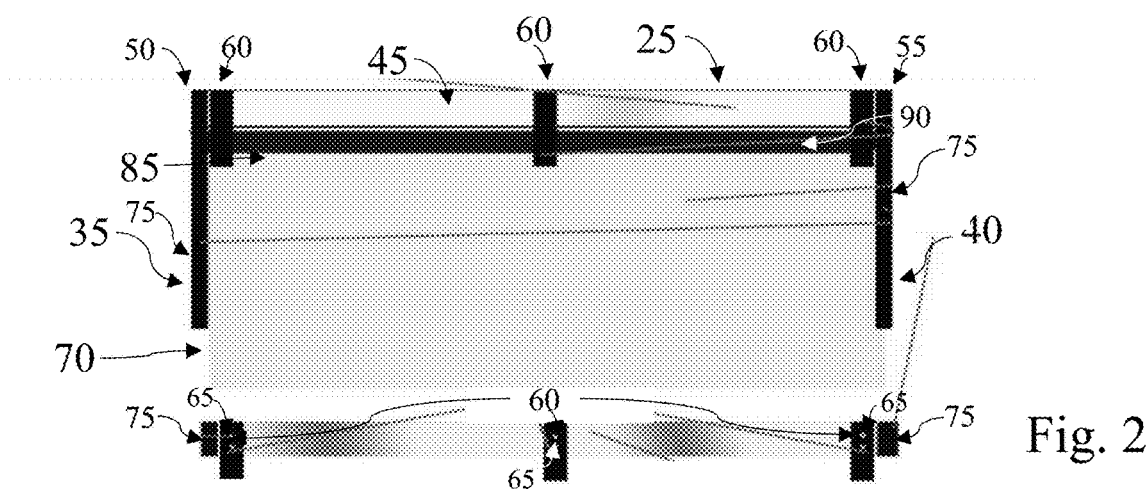
Fig. 1
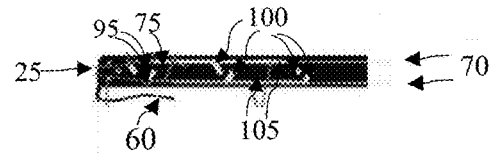
Fig. 2
Fig. 3
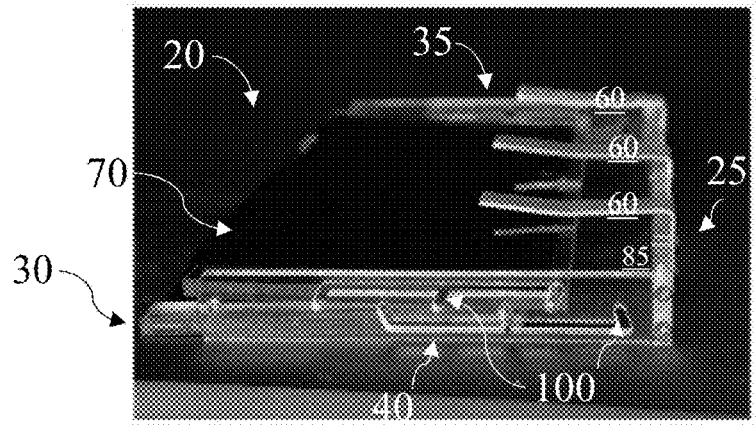
Fig. 4

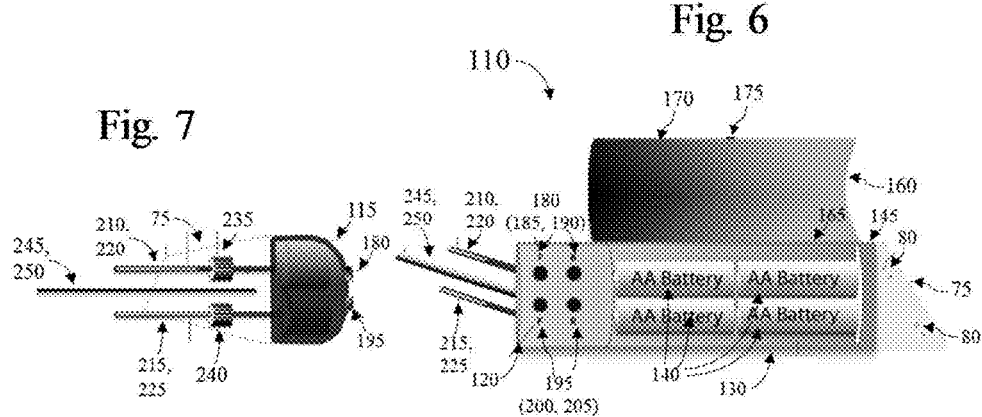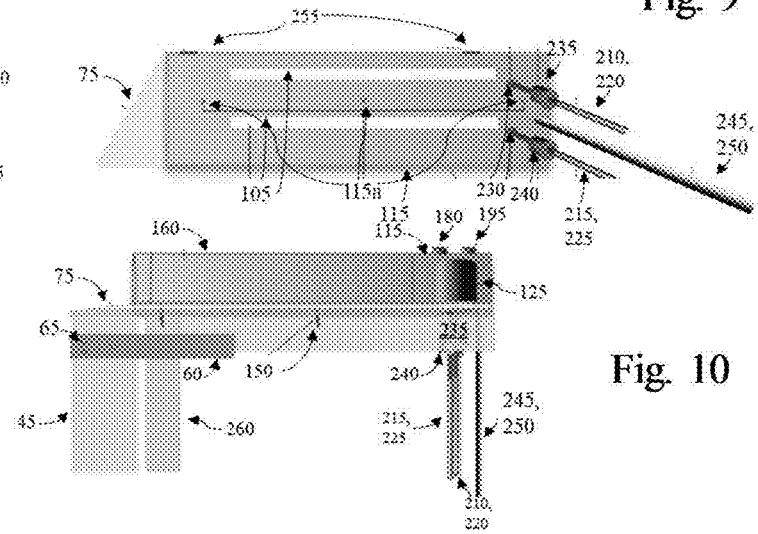

VEHICULAR VISOR VISUAL DRIVING AID

CROSS-REFERENCES TO RELATED APPLICATIONS

This application is a continuation in part of U.S. application Ser. No. 14/993,087 filed Jan. 11, 2016 which claims priority from U.S. Provisional Application Ser. No. 62/101,375 filed Jan. 9, 2015 which are each hereby incorporated herein by reference in their respective entirety.

TECHNICAL FIELD

The present invention relates to a vehicular visor visual driving aid and more particularly, a visor assembly for filtering sunlight through a field of view of a driver.

BACKGROUND OF THE INVENTION

Sunlight from certain angles can be distracting, blinding, or dangerous to the operators of many types of vehicles. Sun visors exist in many modes of transportation, such as automobiles. These provide some relief from the direct sunlight, but many users still find the sunlight to be distracting or blinding at various points throughout the day. Occasionally the problem is that the visor itself needs to be extended. On other occasions an extended visor would not solve the problem because of the angle of the sun; an extended visor would cover too much of the visual field. Different types of lighting throughout the day require different solutions.

The reduction in visibility caused by certain types of lights can cause uncertainty and accidents.

BRIEF SUMMARY OF EMBODIMENTS OF THE INVENTION

The present invention comprises a visor assembly for filtering sunlight through a field of view of a driver. Unique to this invention are tinted visors that are able to be set in a stowed position, positioned upward, and are able to be lowered into the field of vision of the driver, allowing sunlight to pass through the tinted visors to be filtered. Each of the tinted visors has a top edge, at which a placement rod holds each of the tinted visors in place. A tint sleeve surrounds each of the placement rods of each of the tinted visors, and surrounds the top edge of each of the tinted visors. The placement rods secure each of the tinted visors via a plurality of adjustment slots located along each of the tinted visors. Each of the tint railings has a tint track for providing movement of the tinted visors along thereof.

A position-control section of the visor assembly, located adjacent to the tint railings of the visor assembly, allows the visor assembly to be adjusted, and comprises: a casing comprising a section for a pair of mini motors and a section for a battery cartridge. The casing has a group of three casing ports for affixing the casing to one of the tint railings, via three flathead screws. The pair of mini motors operates the position-control section and runs on DC power. The battery cartridge houses a plurality of DC-power batteries, and has a top edge. The plurality of DC-power batteries supplies power to the pair of mini motors. A pair of track pins is etched into the top edge of the battery cartridge for stabilizing the visor assembly. Each of the mini motors is held in place by a mount. There is a lid for closing over the section of the casing for the battery cartridge. The lid has an edge attached to the casing over the section of the casing for the battery cartridge, and has an edge detachable from the casing, providing a means for opening and closing the lid. The edge detachable from the casing has a flip tab for facilitating opening and closing of the lid.

The casing further comprises a first pair of buttons. The first pair of buttons comprises a button for forward motion of the position-control section of the visor assembly and a button for reverse motion of the position-control section of the visor assembly. The first pair of buttons is located above a second pair of buttons. The second pair of buttons comprises a button for forward motion of the position-control section of the visor assembly and a button for reverse motion of the position-control section of the visor assembly. The first pair of buttons controls the motion of a first drive shaft for controlling the position of the visor assembly. The second pair of buttons controls the motion of a second drive shaft for controlling the position of the visor assembly.

Both the first drive shaft and the second drive shaft have an axis, and both are held in place by a drive shaft through port. A first drive wheel is located about the axis of the first drive shaft. A second drive wheel is located about the axis of the second drive shaft. A torque rod is located along a centrally-located horizontal axis between the first drive shaft and the second drive shaft, maintaining the distance between the tint railings and reducing potential flexing. A pair of battery hinges allows the lid to swing open. A tint arm being located at one of the tint tracks holds the track pin in place. A pair of tint arm wheel pressure treads allow the first drive wheel and the second drive wheel to roll the tint arm into a desired position.

In a more specific embodiment of the visor assembly, the tinted visors include at least one amber tinted visor. The amber tinted visor is amber in color and adds contrast and visual acetate distinction in low-light driving situations. The tinted visors also include at least one gradient tinted visor. The gradient tinted visor has a color gradient transitioning from a dense, dark blue color, for adding brilliance and attenuation, to clear acetate, for providing an unobstructed view of traffic.

Various objects, features, aspects, and advantages of the present invention will become more apparent from the following detailed description of preferred embodiments of the invention, along with the accompanying drawings in which like numerals represent like components.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 1 shows a bottom view of a visor assembly. Detailed are a top edge, a bottom edge, a left side, and a right side of the visor assembly. A visor ridge is also shown, with a first end and a second end. A plurality of visor clamps for clamping onto the top edge of the visor assembly are shown. A plurality of tinted visors, being positioned in series with respect to each other, and secured in place by a pair of tint railings, is detailed. Each of the tinted visors has a top edge, at which a placement rod holds each of the tinted visors in place.

FIG. 2 shows a rear view of the visor assembly. The plurality of visor clamps for clamping onto the top edge of the visor assembly are shown, in addition to a plurality of pairs of clamp screws, located on each of the visor clamps, for attaching the visor ridge to each of the visor clamps. The pair of tint railings is also shown.

FIG. 3 shows a side view of the visor assembly. A tint sleeve surrounds each of the placement rods of each of the tinted visors, and surrounds the top edge of each of the tinted visors. The placement rods secure each of the tinted visors via a plurality of adjustment slots located along each of the tinted visors. Each of the tint railings is placed respectively with one on the left side of the visor assembly and one on the right side of the visor assembly. Each of the tint railings has a tint track for providing movement of the tinted visors along thereof.

FIG. 4 shows a similar side view as shown in FIG. 3.

FIG. 6 details a position-control section of the visor assembly, with a casing comprising a section for a pair of mini motors and a section for a battery cartridge. The casing has a group of three casing ports for affixing the casing to one of the tint railings, via three flathead screws. The battery cartridge houses a plurality of DC-power batteries, and has a top edge. The pair of track pins is etched into the top edge of the battery cartridge. There is a lid for closing over the section of the casing for the battery cartridge, with an edge attached to the casing over the section of the casing for the battery cartridge, and an edge detachable from the casing, which also has a flip tab. The casing further comprises a first pair of buttons and a second pair of buttons.

FIG. 7 shows a mount for holding the pair of mini motors in place. A first drive shaft, a second drive shaft, each having an axis, are also shown. Each is held in place by a drive shaft through port.

FIG. 8 shows the mini motors being held in place by the mount, as well as the other elements shown in FIG. 7.

FIG. 9 details both the first drive shaft and the second drive shaft, with their respective axes, and each held in place by a drive shaft through port. The first drive wheel and second drive wheel are also shown. A torque rod is located along a centrally-located horizontal axis between the first drive shaft and the second drive shaft. A pair of battery hinges is also shown, as well as a tint arm being located at one of the track pins. Also shown are the tint tracks, the plurality of visor clamps, and the plurality of pairs of clamp screws.

FIG. 10 is a top view of FIG. 9.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 5:
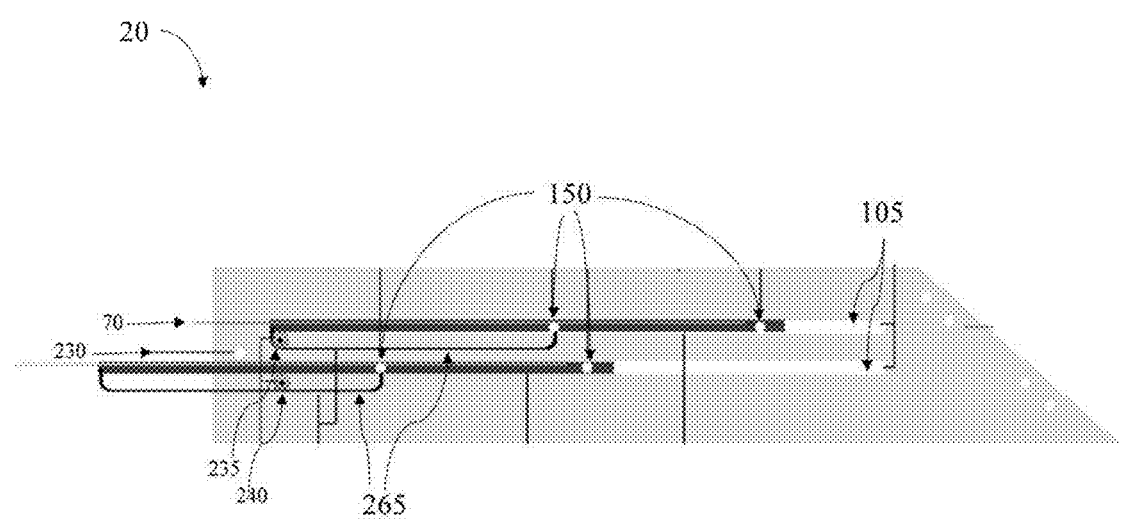
FIG. 5 shows a side view of the visor assembly, with more elements detailed. A pair of track pins is shown, as is a pair of drive wheels, a pair of tint arm wheel pressure treads, and a drive shaft through port. The plurality of tinted visors is also shown, as well as the tint tracks.

A visor assembly 20, shown in FIGS. 1-5, has been designed for blocking sunlight from the field of vision of a driver and improving visibility for the driver. The visor assembly 20 comprises a top edge 25, a bottom edge 30, a left side 35, and a right side 40. A visor ridge 45, which optionally may be comprised of aluminum or acrylic, is a folded ridge that provides a foundation for the visor assembly 20. The visor ridge 45 has a first end 50 and a second end 55. There exists a plurality of visor clamps 60 for clamping onto the top edge 25 of the visor assembly 20. Additionally, a plurality of fasteners, which may optionally comprise pairs of clamp screws 65, located on each of the visor clamps 60, exists for attaching the visor ridge 45 to each of the visor clamps 60.

The visor assembly 20 further comprises a plurality of tinted visors 70, being positioned in series with respect to each other, and secured in place by a pair of tint railings 75. Each of the tint railings 75 is placed respectively with one on the left side 35 of the visor assembly 20 and one on the right side 40 of the visor assembly 20. Two pairs of tint railing screws 80 secure each of the tint railings 75 to the visor ridge 45, with each pair of tint railing screws 80 being respectively located on the first end 50 of the visor ridge 45 and on the second end 55 of the visor ridge 45. These are detailed in FIGS. 1-5.

Referring to FIGS. 1-5, the plurality of tinted visors 70 are configured to be set in a stowed position, positioned upward, and lowered into the field of vision of the driver, allowing sunlight to pass through the plurality of tinted visors 70 to be filtered. Each of the tinted visors 70 has a top edge 85, at which a placement rod 90 holds each of the tinted visors 70 in place. A tint sleeve 95 surrounds each of the placement rods 90 of each of the tinted visors 70, and surrounds the top edge 85 of each of the tinted visors 70. The placement rods 90 secure each of the tinted visors 70 via a plurality of adjustment slots 100 located along each of the tinted visors 70. Each of the tint railings 75 has a tint track 105 for providing movement of the tinted visors 70 along thereof.

As detailed in FIGS. 6-10, a position-control section 110 of the visor assembly 20, located adjacent to the tint railings 75 of the visor assembly 20, allows the visor assembly 20 to be positionally-adjusted, and comprises: a casing 115 comprising a section 120 for a pair of mini motors 125 and a section 130 for a battery cartridge 135. A group of three casing ports 115a affixes the casing 115 to one of the tint railings 75 via three flathead screws. The pair of mini motors 125 operates the position-control section 110 and runs on DC power. The battery cartridge 135 houses a plurality of DC-power batteries 140, and has a top edge 145. The plurality of DC-power batteries 140 supplies power to the pair of mini motors 125. A pair of track pins 150 is etched into the top edge 145 of the battery cartridge 135 for stabilizing the visor assembly 20. Each of the mini motors 125 is held in place by a mount 155. There is a lid 160 for closing over the section 130 of the casing 115 for the battery cartridge 135. The lid 160 has an edge attached 165 to the casing 115 over the section 130 of the casing 115 for the battery cartridge 135, and has an edge detachable 170 from the casing 115, providing a means for opening and closing the lid 160. The edge detachable 170 from the casing 115 has a flip tab 175 for facilitating opening and closing of the lid 160.

Referring to FIGS. 6-10, the casing 160 further comprises a first pair of buttons 180. The first pair of buttons 180 comprises a button for forward motion 185 of the position-control section 110 of the visor assembly 20 and a button for reverse motion 190 of the position-control section 110 of the visor assembly 20. The first pair of buttons 180 is located above a second pair of buttons 195. The second pair of buttons 195 comprises a button for forward motion 200 of the position-control section 110 of the visor assembly 20 and a button for reverse motion 205 of the position-control section 110 of the visor assembly 20. The first pair of buttons 180 controls the motion of a first drive shaft 210 for controlling the position of the visor assembly 20. The second pair of buttons 195 controls the motion of a second drive shaft 215 for controlling the position of the visor assembly 20.

Figure 11:
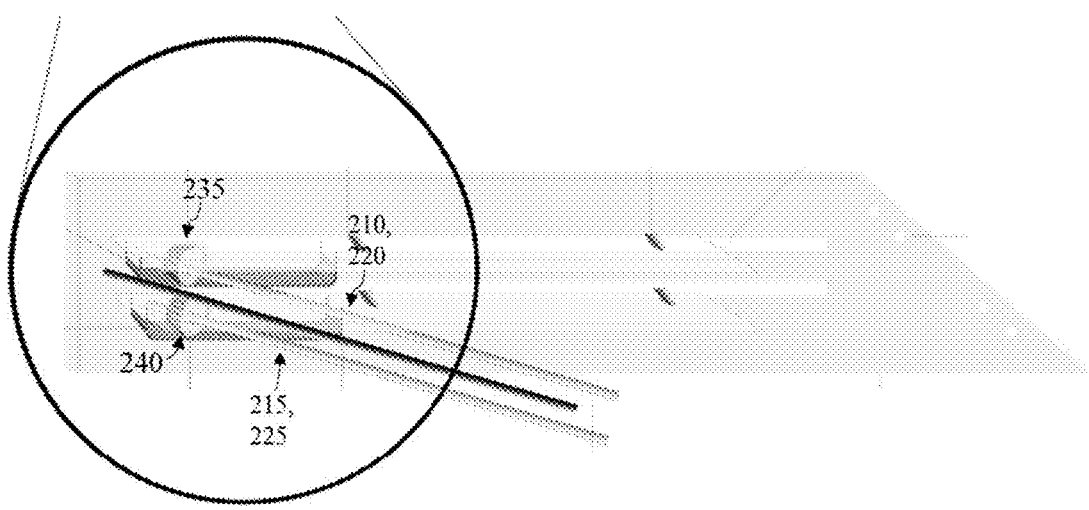
FIG. 11 shows a honed-in view of the first drive wheel, the second drive wheel, the first drive shaft, and the second drive shaft.

As detailed in FIGS. 6-11, both the first drive shaft 210 and the second drive shaft 215 have an axis 220, 225, and each are held in place by a drive shaft through port 230. A first drive wheel 235 is located about the axis 220 of the first drive shaft 210. A second drive wheel 240 is located about the axis 225 of the second drive shaft 215. A torque rod 245 is located along a centrally-located horizontal axis 250 between the first drive shaft 210 and the second drive shaft 215, maintaining the distance between the tint railings 75 and reducing potential flexing. A pair of battery hinges 255 allows the lid 160 to swing open. A tint arm 260 being located at one of the tint tracks 105 holds the track pin 150 in place. A pair of tint arm wheel pressure treads 265 allow the first drive wheel 235 and the second drive wheel 240 to roll the tint arm 260 into a desired position.

In a more specific embodiment of the visor assembly 20, the tinted visors 70 include at least one amber tinted visor 270. The amber tinted visor 270 is amber in color and adds contrast and visual acetate distinction in low-light driving situations. The tinted visors 70 also include at least one gradient tinted visor 275. The gradient tinted visor 275 has a color gradient transitioning from a dense, dark blue color, for adding brilliance and attenuation, to a clear acetate, for providing an unobstructed view of traffic.

What is claimed is:

1. A visor assembly for blocking sunlight from a field of vision of a driver, improving visibility for the driver, and being motorized for positional adjustment, comprising:
a top edge, a bottom edge, a left side, and a right side;
a visor ridge, being a folded ridge for providing a foundation for the visor assembly, and having a first end and a second end;
a plurality of visor clamps for clamping onto the top edge of the visor assembly;
a plurality of tinted visors being positioned in series with respect to each other, and secured in place by a pair of tint railings, each of the tint railings being placed respectively with one on the left side of the visor assembly and one on the right side of the visor assembly;
  wherein the tinted visors are configured to be set in a stowed position, positioned upward, and lowered into the field of vision of the driver, allowing sunlight to pass through the tinted visors to be filtered;
each of the tinted visors having a top edge, at which a placement rod holds each of the tinted visors in place;
a tint sleeve surrounding each of the placement rods of each of the tinted visors, and surrounding the top edge of each of the tinted visors, the placement rods securing each of the tinted visors via a plurality of adjustment slots located along each of the tinted visors, each of the tint railings having a tint track for providing movement of the tinted visors along thereof;
a position-control section of the visor assembly, being located adjacent to the tint railings of the visor assembly, for allowing the visor assembly to be positionally-adjusted, comprising:
  a casing comprising a section for a pair of mini motors and a section for a battery cartridge, and the pair of mini motors each being held in place by a mount;
  the pair of mini motors for operating the position-control section;
  the casing further comprising a first pair of buttons;
  the first pair of buttons comprising a button for forward motion of the position-control section of the visor assembly and a button for reverse motion of the position-control section of the visor assembly;
  the second pair of buttons comprising a button for forward motion of the position-control section of the visor assembly and a button for reverse motion of the position-control section of the visor assembly;
  the first pair of buttons controlling motion of a first drive shaft for controlling position of the visor assembly; and
  the second pair of buttons controlling motion of a second drive shaft for controlling position of the visor assembly.

2. The visor assembly of claim 1, further comprising:
a plurality of pairs of clamp screws, located on each of the visor clamps, for attaching the visor ridge to each of the visor clamps; and
a pair of pairs of tint railing screws, with each pair of tint railing screws being respectively located on the first end of the visor ridge and on the second end of the visor ridge, for securing each of the tint railings to the visor ridge.

3. The visor assembly of claim 1, wherein the casing has a group of three casing ports for affixing the casing to one of the tint railings via fasteners.

4. The visor assembly of claim 1, further comprising:
each of the first drive shaft and the second drive shaft having an axis, and each being held in place by a drive shaft through port;
a first drive wheel being located about the axis of the first drive shaft;

a second drive wheel being located about the axis of the second drive shaft; and a torque rod being located along a centrally-located horizontal axis between the first drive shaft and the second drive shaft, maintaining the distance between the tint railings and reducing potential flexing.

5. The visor assembly of claim 1, further comprising:

a pair of track pins being etched into the top edge of the battery cartridge for stabilizing the visor assembly;

a tint arm being located at one of the tint tracks for holding one of the track pins in place; and a pair of tint arm wheel pressure treads for allowing the first drive wheel and the second drive wheel to roll the tint arm into a desired position.

6. The visor assembly of claim 1, further comprising:

a lid for closing over the section of the casing for the battery cartridge, the lid having an edge attached to the casing over the section of the casing for the battery cartridge, and the edge detachable from the casing, providing a means for opening and closing the lid;

wherein the edge has a flip tab for facilitating opening and closing of the lid; and a pair of battery hinges allowing the lid to swing open.

7. The visor assembly of claim 1, wherein:

the tinted visors comprise at least one amber tinted visor;

the amber tinted visor being amber in color and adding contrast and visual acetate distinction in low-light driving situations;

the tinted visors also including at least one gradient tinted visor, the gradient tinted visor having a color gradient transitioning from a dense, dark blue color, for adding brilliance and attenuation, to a clear acetate, for providing an unobstructed view of traffic.

8. A visor assembly for blocking sunlight from a field of vision of a driver, improving visibility for the driver, and being motorized for positional adjustment, comprising:

a top edge, a bottom edge, a left side, and a right side;

a visor ridge, being a folded ridge for providing a foundation for said visor assembly, and having a first end and a second end;

a plurality of visor clamps for clamping onto said top edge of said visor assembly;

a plurality of fasteners, located on each of said visor clamps, for attaching said visor ridge to each of said visor clamps;

a plurality of tinted visors being positioned in series with respect to each other, and secured in place by a pair of tint railings;

each of said tint railings being placed respectively with one on said left side of said visor assembly and one on said right side of said visor assembly;

a pair of pairs of tint railing screws, with each pair of tint railing screws being respectively located on said first end of said visor ridge and on said second end of said visor ridge, for securing each of said tint railings to said visor ridge;

said tinted visors configured to be set in a stowed position, positioned upward, and lowered into the field of vision of the driver, allowing sunlight to pass through said tinted visors to be filtered;

each of said tinted visors having a top edge, at which a placement rod holds each of said tinted visors in place;

a tint sleeve surrounding each of said placement rods of each of said tinted visors, and surrounding said top edge of each of said tinted visors;

said placement rods securing each of said tinted visors via a plurality of adjustment slots located along each of said tinted visors;

each of said tint railings having a tint track for providing movement of said tinted visors along thereof;

a position-control section of said visor assembly, being located adjacent to said tint railings of said visor assembly, for allowing said visor assembly to be positionally-adjusted, comprising:

a casing comprising a section for a pair of mini motors and a section for a battery cartridge;

said casing having a group of three casing ports for affixing said casing to one of said tint railings via three flathead screws;

said pair of mini motors for operating said position-control section, and running on DC power;

said battery cartridge housing a plurality of DC-power batteries, and having a top edge;

said plurality of DC-power batteries for supplying power to said pair of mini motors;

a pair of track pins being etched into said top edge of said battery cartridge for stabilizing said visor assembly;

said pair of mini motors each being held in place by a mount;

a lid for closing over said section of said casing for said battery cartridge;

said lid having an edge attached to said casing over said section of said casing for said battery cartridge, and having an edge detachable from said casing, providing a means for opening and closing said lid;

said edge detachable from said casing having a flip tab for facilitating opening and closing of said lid;

said casing further comprising a first pair of buttons;

said first pair of buttons comprising a button for forward motion of said position-control section of said visor assembly and a button for reverse motion of said position-control section of said visor assembly;

said first pair of buttons being located above a second pair of buttons;

said second pair of buttons comprising a button for forward motion of said position-control section of said visor assembly and a button for reverse motion of said position-control section of said visor assembly;

said first pair of buttons controlling motion of a first drive shaft for controlling position of said visor assembly;

said second pair of buttons controlling motion of a second drive shaft for controlling position of said visor assembly;

each of said first drive shaft and said second drive shaft having an axis, and each being held in place by a drive shaft through port;

a first drive wheel being located about said axis of said first drive shaft;

a second drive wheel being located about said axis of said second drive shaft;

a torque rod being located along a centrally-located horizontal axis between said first drive shaft and said second drive shaft, maintaining the distance between the tint railings and reducing potential flexing;

a pair of battery hinges allowing said lid to swing open;

a tint arm being located at one of said tint tracks for holding one of said track pins in place;

a pair of tint arm wheel pressure treads for allowing the first drive wheel and the second drive wheel to roll the tint arm into a desired position;

said tinted visors including at least one amber tinted visor;
said amber tinted visor being amber in color and adding contrast and visual acetate distinction in low-light driving situations;
　said tinted visors also including at least one gradient tinted visor; and
　said gradient tinted visor having a color gradient transitioning from a dense, dark blue color, for adding brilliance and attenuation, to a clear acetate, for providing an unobstructed view of traffic.

\* \* \* \* \*